Patented Nov. 25, 1952

2,619,471

UNITED STATES PATENT OFFICE 2,619,471

CALCIUM PHOSPHATE PHOSPHORS

Keith H. Butler, Marblehead, Mass., assignor to Sylvania Electric Products Inc., Salem, Mass., a corporation of Massachusetts No Drawing. Application March 14, 1950, Serial No. 149,643

6 Claims. (Cl. 252—301.4)

This invention relates to calcium phosphate phosphors.

Such phosphors activated with manganese have been known in the art for excitation by cathode rays, but would not respond to ultraviolet excitation.

I have found that the addition of tin will cause the phosphor to respond also to ultraviolet, especially when the mol sum of the calcium plus manganese plus tin is below the stoichiometric value of 3.00.

A further advantage of the invention is that the emission color may be varied from pale blue green through pale yellow and orange to deep red by varying the manganese content. The deep red emission can be used with advantage in fluorescent lamps to give a truer rendition of colors than could be obtained with other phosphors.

An additional feature of the invention is the use of a controlled and somewhat reducing atmosphere during the firing of the raw material mixture for the phosphor.

Other features, advantages and objects of the invention will be apparent from the following specification.

I have found that the exact composition of the phosphor is of great importance in obtaining good fluorescence. The stoichiometric amounts of calcium and phosphorus present in tricalcium phosphate are three atoms of calcium and two atoms of phosphorus. In the phosphors made by the process of this invention both manganese and tin are believed to be present as divalent ions and it is thought that they occupy positions in the crystal structure normally filled by calcium and that they may be considered as stoichiometrically equivalent to calcium. I have found that materials with good fluorescent properties are obtained if the sum of Ca+Mn+Sn is slightly under the stoichiometric value of 3.00. Values somewhat below 3.00 give acceptable phosphors while if the sum of Ca+Mn+Sn rises to 3.02 the emission color changes from orange to blue white and the intensity is considerably lower. If this sum is allowed to rise to 3.06 the powder is substantially non-fluorescent. This is shown by the following table in which the number of mols of phosphate were kept constant at 2.00, the tin at .02 gram atom and the manganese at .04 gram atom:

| Total Ca+Sn+Mn | Photometer readings | | | | Fluorescent color |
|---|---|---|---|---|---|
| | Viscor | Red | Green | Blue | |
| 2.90 | 32 | 93 | 30 | 20 | Pink orange. |
| 2.94 | 31 | 90 | 31 | 25 | Do. |
| 2.98 | 34 | 90 | 31 | 15 | Do. |
| 3.02 | 21 | 37 | 22 | 40 | Blue white. |
| 3.06 | 1 | 0 | 2 | 5 | Barely visible. |

The photometer readings were made by a photocell, through the various kinds of filters stated, and were expressed in percent of the reading obtained with an arbitrary calcium halophosphate standard. The Viscor filter has a spectral transmission such that the combination of it and the photocell gave a spectral sensitivity corresponding to the normal visibility curve for the eye, so that the readings in the Viscor column correspond to the general brightness of the phosphor emission.

The effect of the manganese and tin content on emission color is shown in the following table, where the atoms of manganese and tin are given for each two mols of phosphate, the total atoms of calcium plus tin plus manganese being between 2.92 to 2.95:

| Atoms, manganese | Atoms, tin | Photometer readings | | | | Fluorescent color |
|---|---|---|---|---|---|---|
| | | Viscor | Red | Green | Blue | |
| .00 | .02 | 80 | 58 | 89 | 165 | Pale greenish blue. |
| .01 | .02 | 64 | 93 | 68 | 85 | Pale yellow. |
| .02 | .02 | 49 | 96 | 50 | 50 | Pale orange. |
| .04 | .02 | 37 | 99 | 34 | 30 | Pink orange. |
| .08 | .02 | 21 | 106 | 15 | 10 | Orange red. |
| .14 | .02 | 12 | 72 | 7 | 10 | Deep red. |
| .20 | .02 | 6 | 40 | 3 | 5 | Do. |
| .02 | .02 | 49 | 96 | 50 | 50 | Pale orange. |
| .02 | .04 | 50 | 106 | 49 | 25 | Orange. |
| .02 | .08 | 50 | 117 | 50 | 25 | Deep orange. |

In addition to the critical nature of the phosphor composition, I have found that the ambient atmosphere during firing is extremely important. If the raw material mixture is fired in a non-reducing atmosphere, such as oxygen-free nitrogen saturated with water vapor, the resulting powders while white in color are substantially non-fluorescent or at best exhibit only a slight fluorescence generally blue-white in color. If, on the contrary, a mildly reducing atmosphere is used, powders with a brilliant fluorescence are obtained.

This mildly reducing atmosphere is simply obtained by mixing oxygen-free nitrogen with from ½% to 10% hydrogen by volume and then saturating the mixture with water vapor. The amount of reducing gas, which may be either carbon monoxide, hydrogen or other reducing gas, is not of great importance when the tin content is .02 or .04 atom but when it rises above .04 atom of tin to 2.00 atoms of phosphorus, the percent of reducing gas must be held at about 1 to 3% to avoid obtaining powders discolored either gray or yellow. This discoloration is undesirable from an appearance standpoint but does not appreciably affect the fluorescence. The effect of different controlled atmosphere is shown in the following table where the number of atoms of manganese given is in the same terms as before and the atoms of tin, taken similarly, are 0.02:

| Atoms, manganese | Saturated nitrogen | | 1% H₂+99% N₂ (saturated with H₂O) | |
|---|---|---|---|---|
| | Viscor | Red | Viscor | Red |
| .00 | 4 | 1 | 80 | 58 |
| .02 | 7 | 11 | 49 | 96 |
| .04 | 1 | 0 | 37 | 99 |

For higher tin contents, the effect of variations in the hydrogen or reducing component of the nitrogen atmosphere is shown:

| Atoms manganese | Atoms tin | Percent H₂O in Gas | Color of powder | Photometer | |
|---|---|---|---|---|---|
| | | | | Viscor | Red |
| .02 | .08 | 4 | Yellow | 52 | 117 |
| .02 | .08 | 2 | White | 50 | 114 |
| .02 | .08 | ½ | Sl. gray | 43 | 104 |

In the manufacture of these phosphors I prefer to use a mixture of secondary calcium phosphate, calcium carbonate, manganous carbonate and stannous oxide, thus obtaining independent control of the amounts of calcium, manganese, and tin in relation to the phosphate content of the mixture. While these are the preferred components various substitutions are possible. Thus, tricalcium phosphate with diammonium phosphate may be used or calcium carbonate with diammonium phosphate may be used also as the sources of phosphate and calcium. Calcium carbonate may be replaced by other compounds of calcium which break down to the oxide on heating. Other manganese and stannous compounds which form oxides on heating may be used, and the manganese and tin may be introduced in other compounds, such as the chloride, if desired. If the reducing atmosphere is sufficiently strong the tin may be introduced as a stannic compound, $SnO_2$ for example, without adverse effect.

While I prefer to saturate the gas mixture with water vapor to avoid possible reduction of manganese or tin to the free metals or of the excess phosphate to elemental phosphorus, I have found that the gases may be used dry with generally satisfactory results.

I have also found that phosphors exhibiting excellent fluorescence may be made by prefiring the mixture of raw materials in air at temperatures up to 2200° F. and then refiring in a controlled atmosphere (such as I have described) above 2000° F.

As one example of my invention, I will describe the preparation of a phosphor containing .02 atom of tin and .04 atom of manganese. The following proportions of reagent grade chemicals were carefully weighed into a ball mill, ground with acetone as a suspending medium for ½ hour; the mixture was filtered and dried, lightly crushed and placed in porcelain boats for firing.

| | Moles | Grams |
|---|---|---|
| $CaHPO_4$ | 2.00 | ¹ 274.40 |
| $CaCO_3$ | .88 | 88.00 |
| $MnCO_3$ | .04 | 4.60 |
| $SnO$ | .02 | 2.70 |

¹ Containing 2.4 g. free H₂O.

The porcelain boat containing the mixture was placed inside a large silica tube and pushed to the closed end of this tube, which closure was effected by fusing a silica plate to the end. The open end of the tube was covered by a metal plate bearing a rubber gasket and seated firmly against the silica tube so as to establish an airtight joint. This metal plate had two small openings, one of them serving as a vent. A small diameter silica tube which extended to within ½ inch of the boat, was inserted through the other opening. The gas mixture, comprising 1% hydrogen and 99% oxygen-free nitrogen, entered through this tube, flowed back through the outer tube and out through the vent opening. After inserting the boat and seating the end plate, the assembly was flushed for ten minutes before firing started. The closed end of the tube, containing the boat, was inserted through an opening in the wall of a furnace heated to 2200° F., so that the whole length containing the boat was uniformly heated. After one hour in the furnace, the large silica tube was withdrawn and cooled to about 500° F. before opening to withdraw the porcelain boat. The gas flow was maintained during firing and during cooling. The powder fired in this way had photometer readings as follows:

Brightness _____ 35
Red _____ 90
Green _____ 31
Blue _____ 15

I have found that slightly brighter phosphors are obtained if a little ammonium chloride is added to the mixture of raw materials. From ½ to 2% or even larger amounts may be used, but this addition is not essential. While acetone ballmilling was used in preparation of the raw material mixture in the example above, other methods of mixing may also be used, for example, hammermilling a dry blend.

The spectral energy distribution curves of phosphors prepared according to the method of my invention indicate that the fluorescent light contains two components, a broad blue-green band due to tin and peaked at 500 millimicrons, and a narrower deep red band due to manganese and peaked at 650 millimicrons. As the manganese content of the phosphor increases, the manganese band is enhanced and the tin band suppressed, thus accounting for the varying color. The behavior is, therefore, different from tricalcium phosphate activated by cerium and manganese, the only visible emission band of which is in the deep red, since cerium emits no visible light but only long wave ultraviolet radiation. The variable color of my phosphor is an advantage since lamps nearly white in color can be made with the calcium tin manganese phosphate only, and the absence of ultraviolet emission is helpful to the eyes when the phosphor is used for lighting.

Due to the presence of deep red in the emission spectrum, lamps made with this new phosphor give a truer rendition of colors than can be obtained with previously known phosphors.

An advantage of my phosphor over the cerium-activated type of red phosphor is that lamps may be made in the usual way by ballmilling the powder in a nitrocellulose lacquer, coating a bulb, and baking out the carbonaceous matter by application of a flame or of radiant heat, after which electrodes are sealed in and the lamp made in the usual way. A coating of cerium-activated phosphor requires special precautions during baking.

A phosphor prepared by my invention, and having a red reading of 100% was milled in butyl acetate for 2 hours. An extracted sample had a red reading of 100%. Nitrocellulose lacquer was added and a bulb coated and baked out. After baking the red reading on powder removed from the bulbs was 80%, so that the major part of the original fluorescence was retained. Twenty-watt lamps made from similar bulbs were pinkish white in appearance and had an initial output of 18 L. P. W. Colors viewed under these lamps showed a remarkably strong enhancement of reds.

What I claim is:

1. A calcium orthophosphate phosphor activated with manganese and tin in the divalent states and in which the total gram-atoms of calcium, manganese and tin are slightly less than 3.00 for each 2.00 moles of phosphate.

2. The phosphor of claim 1, in which the manganese is present in an amount greater than zero but not greater than about 0.2 gram-atom for each two moles of phosphate.

3. The phosphor of claim 1, in which the tin is present in an amount between about 0.002 to 0.2 mole for each two moles of phosphate.

4. The phosphor of claim 3, in which the manganese is present in an amount greater than zero but not greater than about 0.2 gram-atom for each two mols of phosphate.

5. The method of making a tricalcium orthophosphate phosphor, activated with tin and manganese, the tin being present in the proportion of 0.002 gram-atom to 0.2 gram-atom and the manganese in proportion greater than zero but not greater than 0.2 gram-atom for each two moles of phosphate, and the total number of gram-atoms of calcium plus manganese plus tin being slightly less than three for each two moles of phosphate, said method comprising firing the ingredients necessary to form said tricalcium orthophosphate phosphor in a slightly reducing atmosphere of about ½% to 10% hydrogen and 99½% to 90% nitrogen, the latter being oxygen-free.

6. The method of making a tricalcium orthophosphate phosphor, activated with tin and manganese, which comprises firing the ingredients necessary to form said tricalcium phosphor, in a slightly reducing atmosphere of about ½% to 10% hydrogen and 99½ to 90% nitrogen, the latter being oxygen-free.

KEITH H. BUTLER.

REFERENCES CITED

The following references are of record in the file of this patent:

UNITED STATES PATENTS

| Number | Name | Date |
| --- | --- | --- |
| 2,270,124 | Huniger | Jan. 13, 1942 |

FOREIGN PATENTS

| Number | Country | Date |
| --- | --- | --- |
| 578,272 | Great Britain | June 21, 1946 |